W. L. COOLEY & W. F. BACH.
CUTTING TOOL.
APPLICATION FILED OCT. 26, 1908.
1,128,294.
Patented Feb. 16, 1915.
2 SHEETS—SHEET 2.
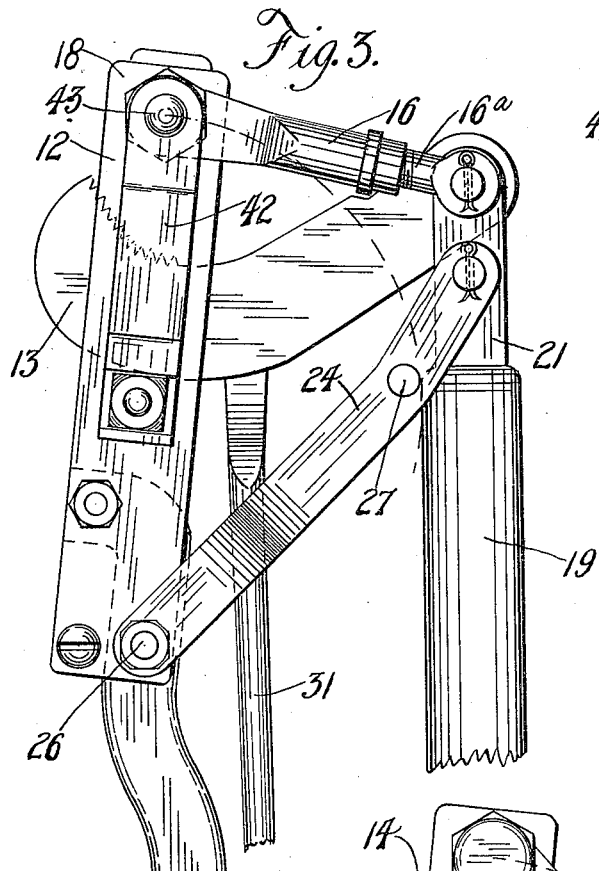
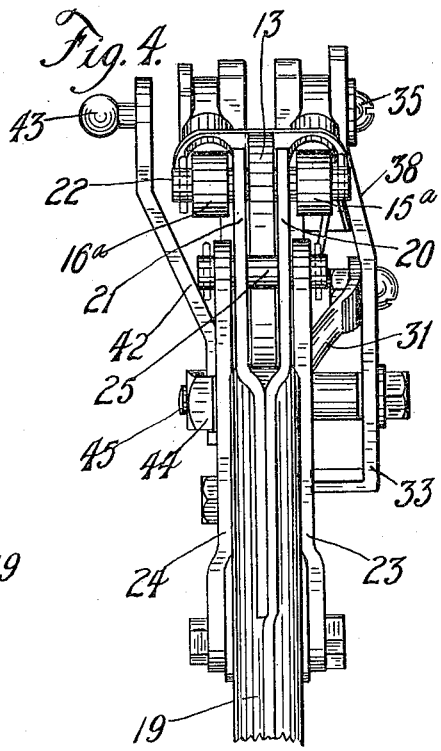
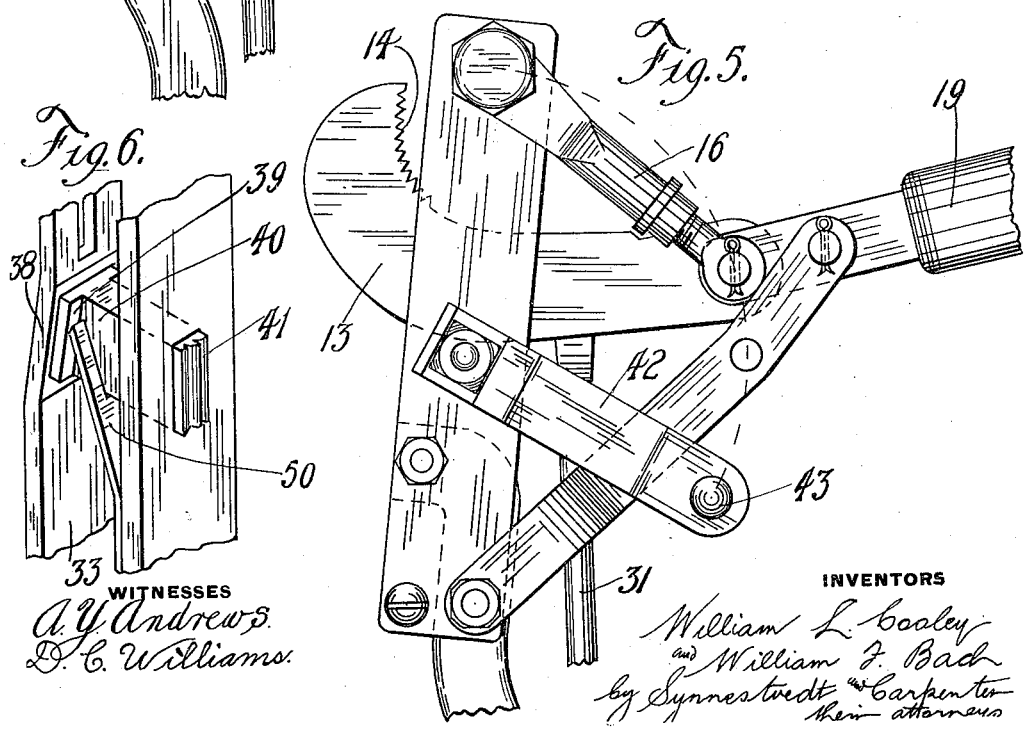
WITNESSES
A. Y. Andrews.
D. C. Williams.
INVENTORS
William L. Cooley
and William F. Bach
by Synnestvedt and Carpenter
their attorneys

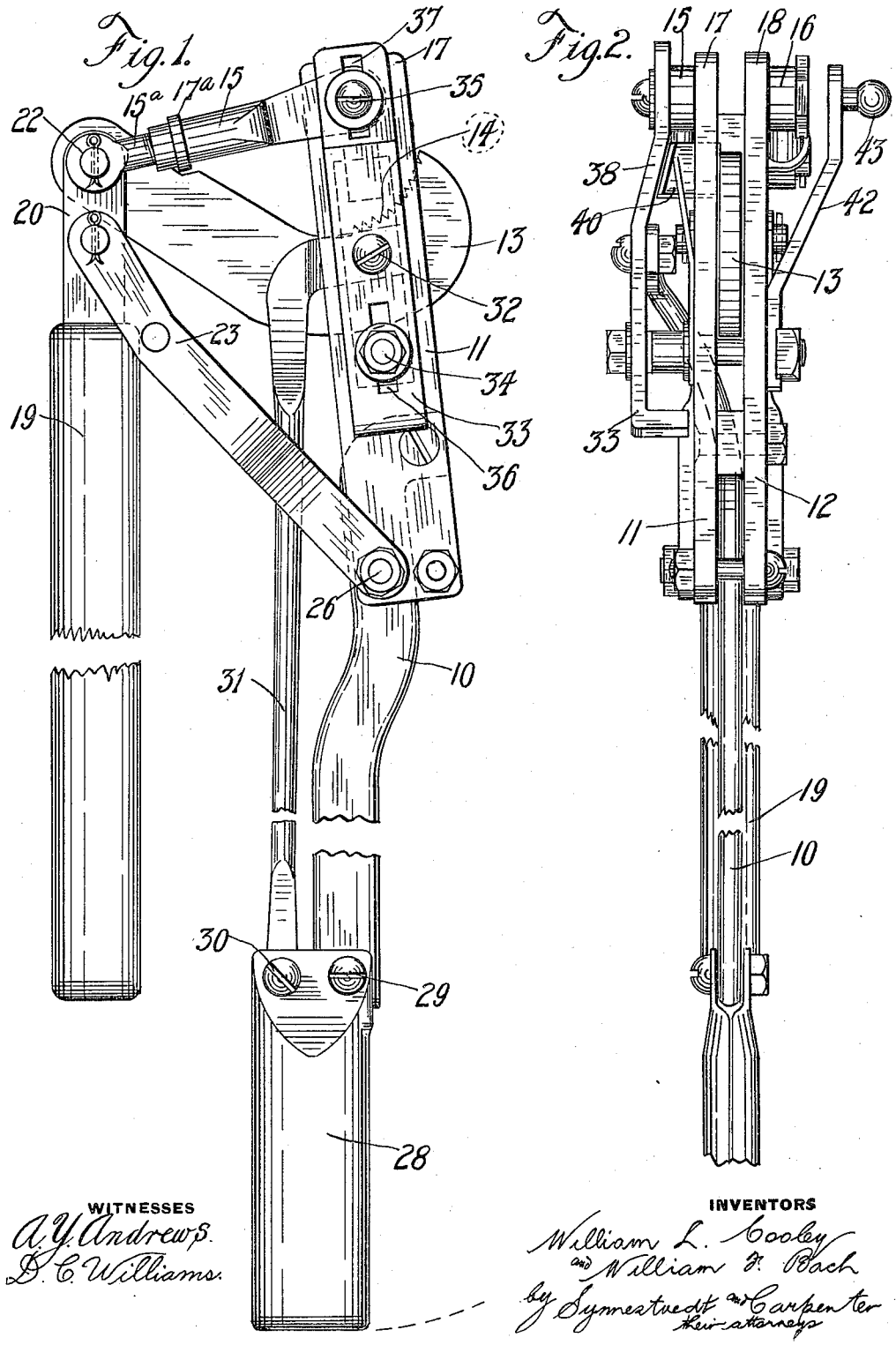

UNITED STATES PATENT OFFICE.

WILLIAM L. COOLEY, OF EVANSTON, AND WILLIAM F. BACH, OF CHICAGO, ILLINOIS.

CUTTING-TOOL.

1,128,294. Specification of Letters Patent. Patented Feb. 16, 1915.

Application filed October 26, 1908. Serial No. 459,467.

*To all whom it may concern:*

Be it known that we, WILLIAM L. COOLEY, and WILLIAM F. BACH, citizens of the United States, residing, respectively, at Evanston and Chicago, in the county of Cook and State of Illinois, have invented certain new and useful Improvements in Cutting-Tools, of which the following is a specification.

Our invention relates to devices for cutting sheet metal and particularly metal having considerable resistance to shearing stresses, such as heavy sheet iron, steel plates and the like.

The principal objects of our invention are to provide a tool of the class described which is adapted for readily cutting sheets which are in place, to facilitate their removal and thereby avoid the delay incident to removing rivets; to provide a tool that is adaptable for cutting sheets of varying thicknesses and which will cut such sheets in such a manner as to leave straight true edges and avoid the canting or turning of the edges such as is consequent upon cutting sheets by shears or tools having a shearing action; to provide means for regulating such tool in such a manner that it may be used with equal facility in cutting sheets of different dimensions, materials, resistances and other qualities; and to provide means for clearing the cutter device of the cut-away material, together with such other objects and advantages as will hereinafter appear.

To accomplish the stated objects, and others which will be obvious to those who are skilled in the arts in which our invention is useful, we have provided the construction illustrated in the accompanying drawings wherein—

Figure 1 is a side elevation of a tool embodying our invention in preferred form, the parts being shown in the relation they are caused to assume at the end of a cutting stroke. Fig. 2 is an under plan view of the device illustrated in Fig. 1; Fig. 3 is a side view of the device taken from the side opposite to that shown in Fig. 1; Fig. 4 is a top plan view of the device; Fig. 5 is a view similar to Fig. 1, save that the parts are shown in the relative position they are caused to assume preparatory to the commencement of a cutting operation; and Fig. 6 is an enlarged detail of the gripping mechanism employed in connection with our improved form of device.

Referring to Figs. 1, 2 and 3 it will be observed that in carrying out our invention we provide a fixed lever 10 upon which are mounted the stationary cutters 11 (Figs. 1 and 2) and 12 (Figs. 2 and 3) which are spaced apart at one end by the lever 10. Between the cutters 11 and 12 we mount a moving cutter 13 provided with a serrated edge 14 for a purpose to be hereinafter more particularly described. The moving cutter 13 is supported by link members $15^a$ and $16^a$ respectively adjustable telescopically within the corresponding members 15 and 16, mounted at the free ends 17 and 18 of the stationary cutters 11 and 12, and held in relative position by the spacing bar $17^a$. For moving the cutter 13 relatively to the cutters 11 and 12 we provide an operating lever 19 having a bifurcated end consisting of the parallel members 20 and 21; the members 13, 15, 16, 20 and 21 being assembled together upon and held in relative position by a common trunnion shaft 22. As a fulcrum for the lever 19 we provide the links 23 and 24 upon which the lever 19 is mounted and held in position by the trunnion shaft 25, the ends of the links 23 and 24 being carried upon the stationary lever 10 by the trunnion shaft 26, passing therethrough, the approach of the levers 10 and 19 being limited by the rivet 27.

Referring to Figs. 1, 2 and 6 it will be seen that for the purpose of providing clamping means for holding the strip that is cut out of the sheet of material in the operation of our tool, we provide the fixed lever 10 with an operating handle 28 pivoted to the lever 10 at 29, and pivoted at 30 to a connecting rod 31 the other end of which is pivoted at 32 to a sliding cam member 33 which is supported upon the stationary cutter 11 by means of studs 34 and 35 engaging respectively the slots 36 and 37 in said cam 33, (see Fig. 1). The cam 33 is provided with an offset portion 38 adapted to press against a shoe 39 provided on one end of a movable gripping device 40, the opposite end of which is provided with teeth as indicated at 41 for gripping the cut-away portion in the operation of our improved tool. The gripping device is normally held against the cam 33 by means of a forked spring 50 bearing on the inner surface of the shoe 39.

Referring to Figs. 2, 3 and 4 it will be apparent that for the purpose of varying the space between the fixed cutters 11 and 12 we have provided an adjusting lever 42 operable by the handle 43 which has threaded connection as indicated at 44 with the bolt 45 passing through the cutters 11 and 12, so that when the adjusting lever 42 is moved from the position indicated in Fig. 3 in the direction indicated by the dotted line, the cutters 11 and 12 will be caused to approach each other as much as may be required in the judgment of the user of the device and according to the thickness and quality of the material. In practice we find that when cutting thick and hard material the adjusting device should be substantially in the position shown in Figs. 3 and 4 in order to allow ample clearance on both sides of the moving cutter 13 relatively to the stationary cutters 11 and 12, whereas in cutting thin material such as galvanized or tinned sheets, or comparatively soft material such as hard fiber or aluminum sheets, better results are obtained from the apparatus when a minimum of clearance is provided between the cutters. The bolt 45 also serves as a guide for the rear side of the cutter 13, maintaining it against movement to the left (Figs. 3 and 5).

It will be noted upon reference to Figs. 1, 3 and 5 that the cutting edges of the teeth 14 have been so disposed as to be radii from a substantially common center in such a manner that as the cutter 13 is lifted, the several cutting edges will be brought parallel to the stationary cutters 11 and 12 in order to obtain the maximum shearing effect from action of said cutting edges.

One way of forming these teeth is to make a blank hook and then mark it up with a scratcher and cut the teeth according to the scratches. The marks should be so made that in a general way the teeth are radii from a substantially common center.

In the operation of our improved tool, the handle 10 is moved as far as possible toward the sheet of material to be cut and the operating lever 19 is moved as far as possible in the opposite direction (see Fig. 5) in order that the device may be opened sufficiently to allow the cutter 13 to grip the material, and, when the handle 19 and lever 10 are caused to approach, force the cutter 13 against the stationary cutters 11 and 12, thereby cutting away a portion equal to the width of the cutter 13, and, owing to the serrations of the cutter 13 on the curved surface thereof curling such strip in a spiral. Thereupon, the handle 28 is moved about the pivot 29, the cam 38 is moved to the rear and the gripping device 40 engages the cut-away portion, so that as both of the handles are pushed into (and if necessary, owing to the thickness of the material acted upon, lifted away from) the work the cut-away strip is bent upward or curled in order that it may so clear the device that when the tool is opened, withdrawing the gripping device 40, and the cutter 13 assuming the position of Fig. 5, in order to take a new bite, the strip will not interfere with the movement of the tool into position with respect to the work, that is, as the cutter 13 is moved forward to reëngage therewith, the cutter may be freed from the strip or the work at any time without difficulty and the operation repeated as may be desired.

Having thus described our invention and illustrated its use what we claim as new and desire to secure by Letters Patent is the following:

1. In combination in a sheet metal cutting device, a pair of opposing cutters, an intermediate member fulcrumed relatively thereto and working between the cutters and having a concave serrated operating face having a number of cutting edges adapted successively to engage the sheet, and means whereby the intermediate member and opposing cutters are operated to secure relative movement thereof, the cutting edges of the intermediate member being disposed between the fulcrum point and the ends of the parallel cutters.

2. In a cutter tool, in combination, a pair of cutters fixed relatively to each other and a third cutter arranged therebetween and at substantially right angles thereto and having a concave gripping face radially serrated to provide a plurality of cutting edges, the first two cutters and the third being relatively movable, and means for imparting such relative movement, whereby said cutting edges may be successively brought to bear on material engaged by the tool.

3. A cutter tool comprising, in combination, a lever carrying a plurality of substantially parallel cutting devices, a second lever carrying a cutting device having a concave cutting face disposed oppositely to the first mentioned cutting devices, link means connecting the first named cutting devices with the lever of the concave cutting device, the two levers being fulcrumed for moving the cutting devices relatively to each other, and the concave cutting face being disposed between the fulcrum point of the levers and the ends of the parallel cutters.

4. A cutting tool comprising, in combination, a lever carrying a plurality of cutting devices adjustable toward and from each other, a second lever fulcrumed upon and movable relatively to the first lever and carrying a cutter device adapted to oppose the cutter devices on the first lever, and unitary means for adjusting the plurality of cutting devices.

5. In combination in a cutter tool, a cutter adapted to cut away a portion of the material acted upon, and means for gripping the cut-away portion, all so arranged that in the operation of the tool the gripping device will clear the cut-away portion from the tool.

6. In combination in a cutter tool provided with operating levers, a cutter adapted to cut away a portion of the material acted upon and a gripping device carried by one of the levers, all so arranged that the operation of the tool in cutting causes the gripping device to grip the cut-away portion and clear it from the tool.

7. In combination in a cutter tool, a cutter adapted to cut away a portion of the material acted upon and means for gripping the cut-away portion, all so arranged that in the operation of the tool the gripping device will clear the cut-away portion from the tool, and means for holding the gripping device normally out of contact with the cut-away portion.

8. In combination in a cutter tool, a pair of relatively fixed cutter devices, a third cutter pivotally supported between the two said cutters adjacent the ends thereof and having a hooked shaped operating face provided with a series of serrations the edges of which are inclined relatively to each other and become parallel to the edges of the first two cutters as such serrated edges approach such cutters, and means including link connections at opposite ends of the fixed cutter devices for imparting opposite movement to the two sets of cutters, substantially as shown and described.

9. A cutter tool comprising, in combination, a lever having a pair of cutters arranged thereon, a second lever carrying a third cutter disposed between the first two cutters, an adjustable link carried upon the first lever and supporting the third cutter and second lever, a fulcrum for the second lever carried by the first lever, means for varying the relations of the first two cutters, an operating handle pivotally mounted upon the first lever, a gripping device for gripping the cut-away material, and a connecting rod between said pivoted operating handle, and said gripping device, substantially as described.

10. A cutter tool comprising, in combination, a lever having a pair of cutters arranged thereon, a second lever carrying a third cutter disposed between the first two cutters, an adjustable link carried upon the first lever and supporting the third cutter and second lever, a fulcrum for the second lever carried by the first lever, an operating handle pivotally mounted upon the first lever, a gripping device for gripping the cut-away material, and a connecting rod between said pivoted operating handle, and said gripping device substantially, as described.

11. In combination in a sheet metal cutting tool, a cutter, and a member pivoted to the cutter adjacent its end and provided with a portion movable transversely along the side of the cutter and having a hook shaped serrated gripping face having a number of radially arranged cutting edges adapted successively to engage and carry a portion of the sheet past the cutter and shear it thereon.

12. In combination in a sheet metal cutting device, a pair of opposing cutters mounted for movement toward and from each other, means working between the cutters for grasping a portion of the sheet and carrying it between the cutters, and means for adjusting the cutters toward and from each other whereby the amount of clearance may be varied.

13. A cutter tool comprising, in combination, a lever having a cutter, a second lever carrying a cutter disposed adjacent to the first cutter, a connection carried upon the first lever and supporting the second lever and cutter, an operating handle pivotally mounted on one of said levers, a gripping device for gripping the cut-away material, and a connection between said pivoted operating handle, and said gripping device, substantially as described.

14. A cutter tool comprising, in combination, a lever having a cutter, a second lever carrying a cutter disposed adjacent to the first cutter, a connection carried upon the first lever and supporting the second lever and cutter, a gripping device for gripping the cut-away material, a cam device for operating said gripping device, and means for operating said cam, substantially as described.

15. A cutter tool comprising, in combination, a lever having a cutter, a second lever carrying a cutter disposed adjacent to the first cutter, a connection carried upon the first lever and supporting the second lever and cutter, an operating handle pivotally mounted on one of said levers, a gripping device for gripping the cut-away material, a cam device for operating said gripping device, and a connection between said pivoted operating handle and said cam device for operating said cam, substantially as described.

16. A sheet metal cutting device comprising in combination a pair of opposing cutters, and hooked means working between the cutters for grasping a portion of the sheet, provided with a plurality of transverse cutting edges arranged on said means to bear successively on the material as it is carried between said cutters, said first mentioned cutters and hooked means being provided with fulcrumed levers for operating the device, and the hooked means being disposed between the fulcrum point and the ends of the first mentioned cutters.

In testimony whereof we have hereunto signed our names in the presence of the two subscribed witnesses.

WILLIAM L. COOLEY.
WILLIAM F. BACH.

Witnesses:
PAUL CARPENTER,
DONALD C. WILLIAMS.

Copies of this patent may be obtained for five cents each, by addressing the "Commissioner of Patents, Washington, D. C."